United States Patent [19]

Greene

[11] 4,367,662

[45] Jan. 11, 1983

[54] TRANSMISSION THROTTLE VALVE SYSTEM FOR SUPERCHARGED INTERNAL COMBUSTION ENGINES

[75] Inventor: Thomas L. Greene, Plymouth, Mich.

[73] Assignee: Ford Motor Company, Dearborn, Mich.

[21] Appl. No.: 179,624

[22] Filed: Aug. 20, 1980

[51] Int. Cl.³ .................. B60K 41/16; F02B 33/00
[52] U.S. Cl. ........................ 74/863; 60/598; 74/867; 123/559
[58] Field of Search ............... 74/856, 861, 863, 864, 74/867, 868, 869; 60/598; 123/559

[56] References Cited

U.S. PATENT DOCUMENTS

| | | | |
|---|---|---|---|
| 3,344,681 | 10/1967 | Searles | 74/472 |
| 3,410,159 | 11/1968 | Zundel | 74/863 |
| 4,142,427 | 3/1979 | Grevich | 74/863 |

Primary Examiner—Allan D. Herrmann
Attorney, Agent, or Firm—Donald J. Harrington; Keith L. Zerschling

[57] ABSTRACT

A vacuum pressure regulator for an automatic transmission for use with an internal combustion engine having an air compressor on the intake side of the engine intake manifold whereby the signal made available by the regulator for the automatic transmission regulator is varied to provide transmission torque capacity proportional to engine torque throughout all engine operating modes regardless of whether the compressor is operating.

5 Claims, 4 Drawing Figures

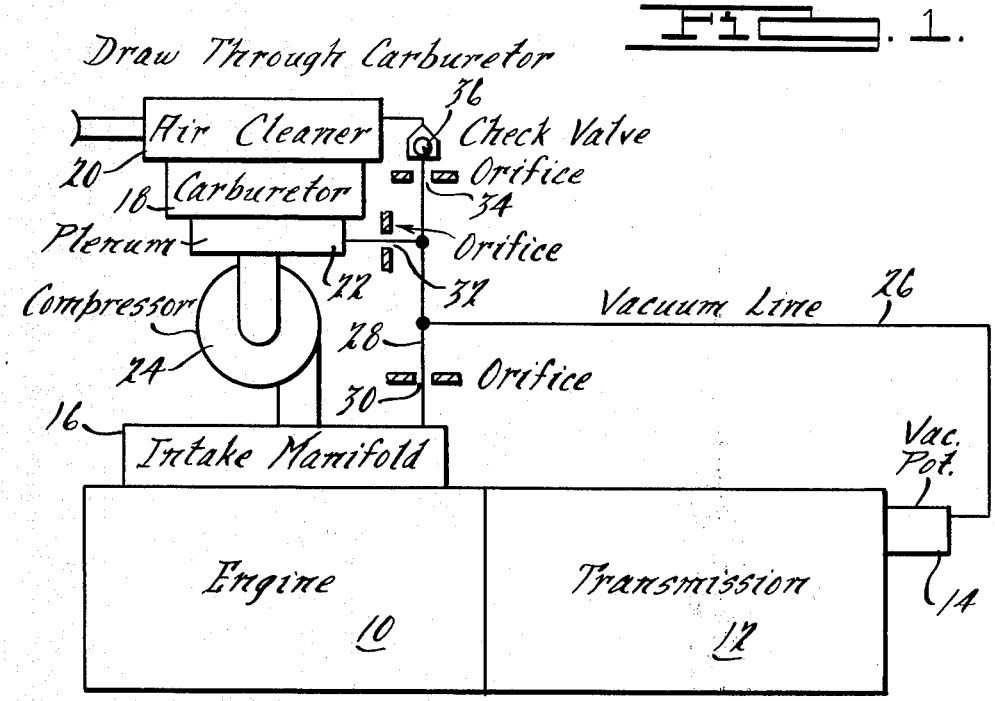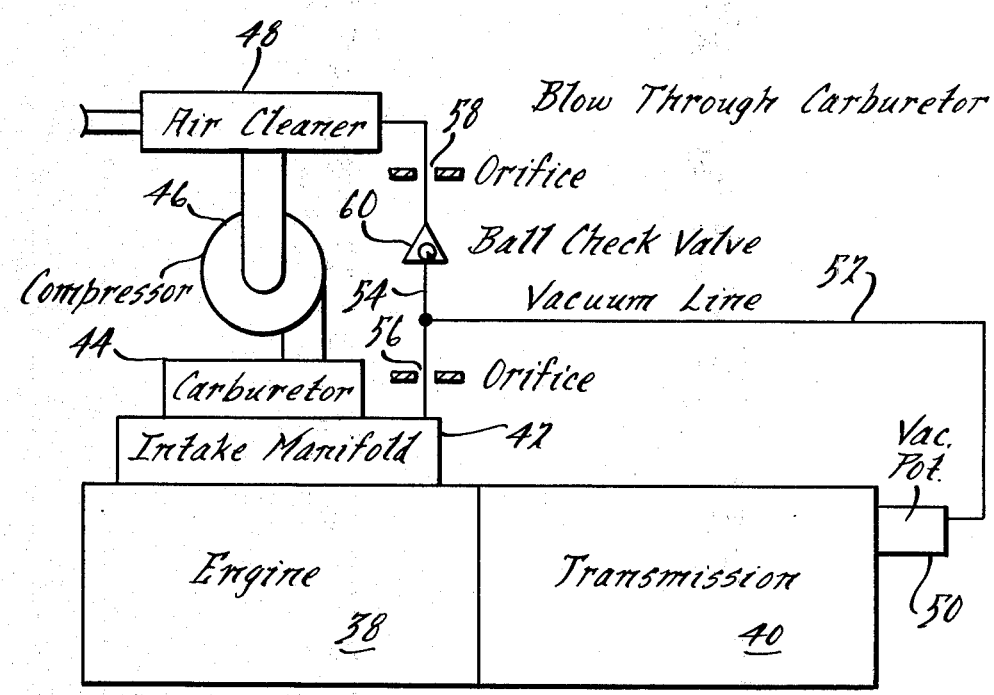

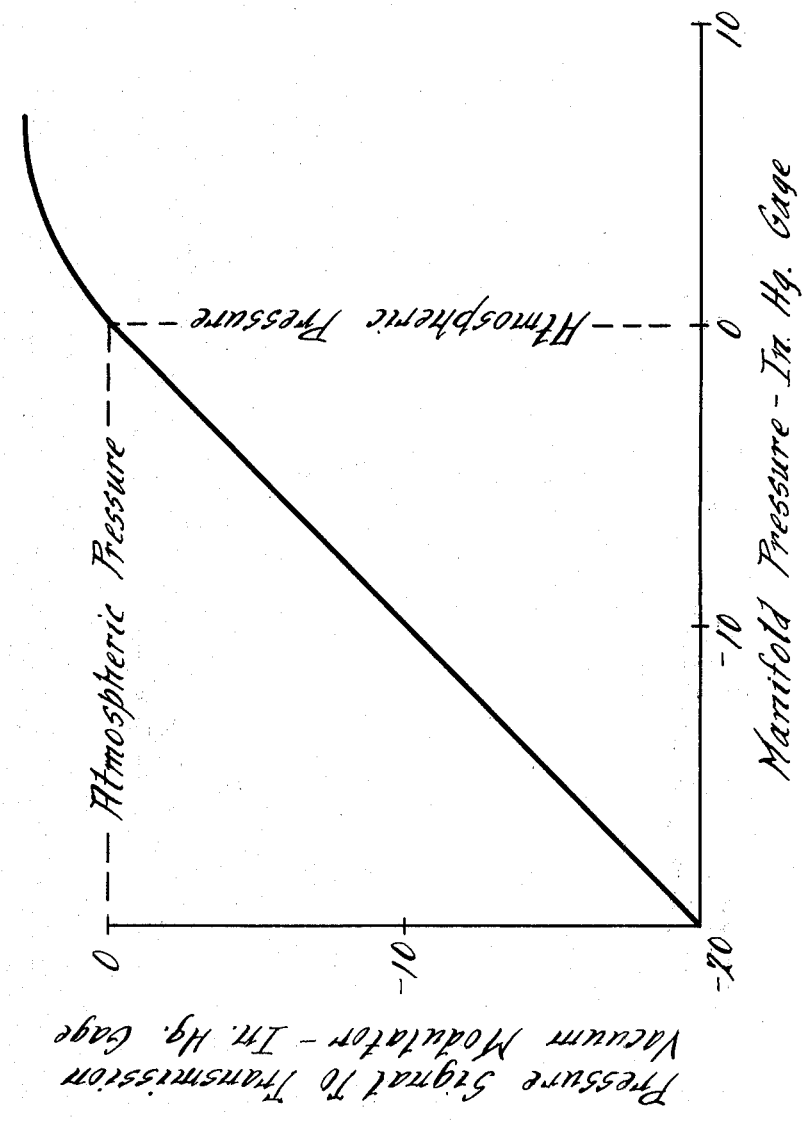

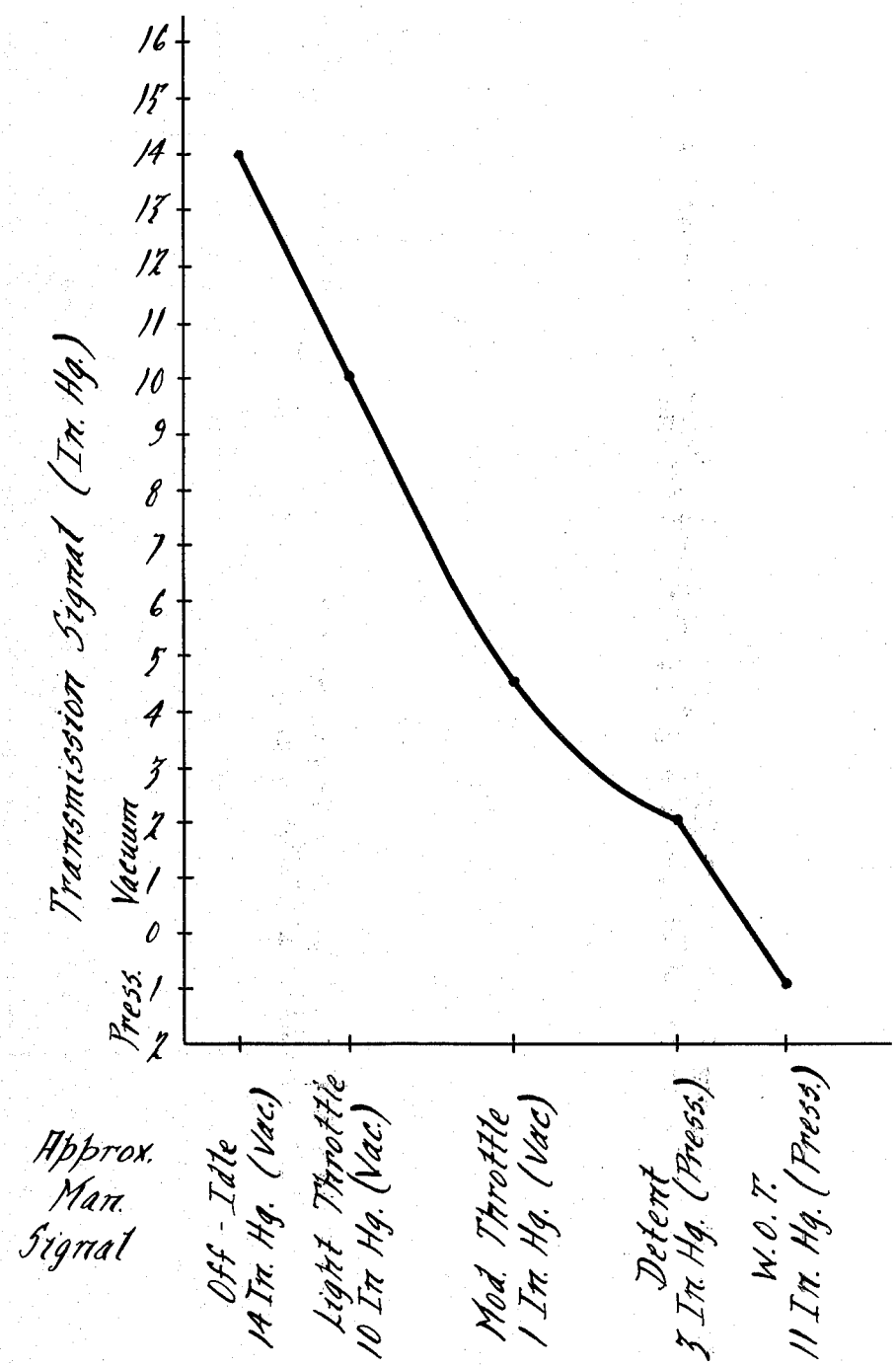

TRANSMISSION THROTTLE VALVE SYSTEM FOR SUPERCHARGED INTERNAL COMBUSTION ENGINES

GENERAL DESCRIPTION OF THE INVENTION

My invention is adapted particularly to be used in automatic transmission control systems of the kind found in contemporary automotive vehicles. An example of such an automatic transmission control system may be found by referring to Searles patent No. 3,344,681. That control system includes a pressure source and fluid pressure operated clutches and brakes for controlling speed ratio changes in an automatic power transmission gear system as torque is delivered from an internal combustion engine to the vehicle traction wheels.

The engine has an air fuel mixture intake manifold that is supplied by the carburetor. A torque signal for the control system is obtained by a vacuum pressure regulator that senses the pressure in the intake manifold for the engine and develops a pressure signal that is an indicator of engine torque. It varies the pressure of a pressure regulator in the control system in accordance with changes in engine torque so that the clutches and brakes will be subjected to sufficient pressure to maintain the required torque transmitting capacity. The torque signal also is used to initiate speed ratio changes together with a pressure signal that is determined by the driven speed of a driven member of the transmission.

In contrast to systems of the kind shown in the Searles disclosure, in which the manifold pressure signal is a fairly reliable indicator of the engine torque, the manifold pressure in those driveline installations that use a turbocharger or supercharger for pressurizing the intake manifold of the engine is not a reliable indicator of engine torque throughout the entire pressure range. For example, the pressure signal delivered to the vacuum pressure regulator in the transmission for a supercharged engine operating mode would not be a reliable indicator of torque if the vacuum pressure regulator were to be calibrated for an unsupercharged manifold. Conversely, if the vacuum regulator is calibrated for a supercharged manifold, the signal obtained when the engine is in an unsupercharged operating mode would not be reliable.

Another example of a vacuum pressure regulator for developing a transmission control signal is disclosed in Zundel U.S. Pat. No. 3,410,159. The Zundel disclosure and the Searles disclosure each shows a vacuum regulator that comprises a housing with a flexible diaphragm that cooperates with the housing to define a vacuum chamber, and a vacuum line extends from that chamber to the engine intake manifold. The diaphragm is spring loaded and is connected mechanically to a throttle valve assembly to produce a modulator pressure signal that is distributed to a transmission shift valve as well as to a pressure regulator for the control system of the transmission.

The system of the present invention provides a strategic arrangement of orifices in association with a vacuum line extending from the vacuum regulator to the manifold together with a check valve arrangement whereby a reliable signal may be obtained by the vacuum regulator regardless of whether the supercharger is operating or is inactive. The orifices are calibrated to be compatible with the calibration of the vacuum pressure regulator itself.

BRIEF DESCRIPTION OF THE FIGURES OF THE DRAWINGS

FIG. 1 is a schematic sketch of a so-called draw-through carburetor arrangement together with the improved orificing and check valve arrangement of the present invention.

FIG. 2 is a schematic drawing of a blow through type carburetor together with the orificing and ball check valve arrangement of the present invention.

FIG. 3 shows a chart indicating the relationship between the pressure signal made available to the transmission vacuum modulator and the manifold pressure for the engine in a blow-through type system.

FIG. 4 is a chart showing the relationship between the transmission signal and the manifold pressure in a so-called draw-through type system.

PARTICULAR DESCRIPTION OF THE INVENTION

In FIG. 1 reference numeral 10 designates schematically an internal combustion engine and numeral 12 schematically designates an automatic power transmission of the kind mentioned in the Searles patent identified above. A vacuum pressure regulator, which sometimes is referred to as a throttle valve pressure regulator assembly, is shown at 14. The air-fuel mixture intake manifold for the engine is designated at 16. It is supplied with an air-fuel mixture by carburetor 18, the input side of which receives air from air cleaner 20. A plenum chamber 22 is located on the downdraft side of the carburetor 18 and on the intake side of a compressor 24. The compressor may be powered by an accessory motor or by exhaust flow gases for the engine in known manner. The outlet of the compressor feeds directly the intake manifold 16.

The vacuum regulator 14 is connected to the manifold 16 through a vacuum line 26 and through a communicating vacuum line 28. A first orifice 30 is located in line 28 between manifold 16 and the vacuum line 26. A second orifice 32 is located in a line extending from the plenum chamber 22 to the line 28. The vacuum line 26 is connected to the line 28 at a point intermediate the orifices 30 and 32. A third orifice 34 is located between the line 28 and air cleaner 20. One way check valve 36 is situated between the orifice 34 and the air cleaner 20 so that pressure may pass through the orifice toward the air cleaner but air is prevented from passing in the opposite direction.

During operation of the system of FIG. 1 in the supercharger mode, the signal developed in line 26 is the signal that is the result of the flow through the control orifices 30 and 32 to the plenum chamber 22. These orifices can be calibrated to produce the desired vacuum signal for the regulator 14. Flow occurs also across orifice 34 and through the check valve 36 and then back through the air cleaner 20. Check valve 36 opens at this time to permit flow across the orifice 34. The orifice 34 is calibrated in conjunction with the orifices 30 and 32. In the unboosted mode of operation the manifold pressures in the intake manifold 16 and in the plenum chamber 22 are equal. The check valve 36 under these conditions is closed and the vacuum signal in line 26 provides a direct connection between the regulator 14 and the manifold 16.

In the boosted mode the manifold pressure signal is a positive pressure and the plenum pressure signal is a vacuum. A pressure drop occurs across the manifold and the plenum orifice 32. In these conditions the orifice 34 and the check valve prevent transfer of an excess pressure to the vacuum modulator 14 at higher manifold boost pressures.

In the embodiment of FIG. 2 numeral 38 designates the engine and numeral 40 designates the transmission. These components are shown in schematic form as in the case of the embodiment of FIG. 1. The intake manifold for the engine, shown at 42, is supplied with an air fuel mixture by carburetor 44. An air compressor 46 serves as a supercharger pump and it communicates with the inlet side of the carburetor. The air supply flow path for the compressor 46 includes air cleaner 48.

The transmission vacuum throttle modulator valve for the transmission shown at 50 is supplied with a vacuum signal through vacuum line 52. An intake manifold vacuum signal line 54 extends from the manifold 42 and through control orifices 56 and 58 to the air cleaner 48. Ball check valve 60 is located in the line 54. The vacuum line 52 is connected to the line 54 at a point intermediate the orifices 54 and 58. When the system shown in FIG. 2 is operating in the unpressurized or supercharged mode, the manifold vacuum closes check valve 60 and the manifold vacuum is applied then directly to the transmission modulator 50. If the compressor 46 is active and the system operates in the supercharger mode, the outlet pressure of the compressor opens the check valve 60 to create a flow path around the compressor. A pressure drop occurs across both orifices 56 and 58. These orifices are calibrated to provide a desired signal in vacuum line 52. Thus a useful torque signal can be obtained with the vacuum modulator valve throughout the entire operating range of the engine regardless of whether the compressor is operative or inoperative.

FIG. 3 shows the variation of manifold pressure with the pressure signal for the blow-through carburetor system of FIG. 2. A pressure signal to the transmission as seen in FIG. 3 is related substantially linearly with respect to changes in manifold pressure. This same linear relationship can be seen in the characteristic curve of FIG. 4 which shows the corresponding signal versus throttle angle relationship for the draw-through carburetor system of FIG. 1.

Having described preferred embodiments of the invention, what I claim and desire to secure by U.S. Letters Patent is :

1. In an automatic power transmission for use with an internal combustion engine having an air intake manifold, a throttle controlled carburetor and a supercharger compressor in the gas flow path through said carburetor:
   a vacuum modulator valve means for said transmission for developing an engine torque signal, said modulator valve means having a vacuum signal line;
   a pressure line extending from said manifold to a location on the upstream side of said carburetor, a first calibrated orifice in said pressure line on one side of said vacuum signal line, a second calibrated orifice in said pressure line on the other side of said vacuum signal line; and
   a check valve in said pressure line on said other side of said vacuum signal line adapted to accommodate flow toward said upstream location but preventing flow in the opposite direction.

2. The combination as set forth in claim 1 wherein said supercharger compressor is located between said carburetor and said intake manifold whereby it is adapted to draw air through said carburetor, said second calibrated orifice being located between said pressure line and the inlet side of said compressor.

3. The combination as set forth in claim 2 wherein said carburetor includes a plenum chamber between said carburetor and the flow inlet side of said supercharger compressor.

4. The combination as set forth in claim 3 wherein said check valve is located in said pressure line between said second calibrated orifice and said upstream location.

5. The combination as set forth in claim 1 wherein said supercharger compressor is located on the upstream side of said carburetor and wherein said check valve is located in said pressure line at a location between said calibrated orifices.

* * * * *